O. J. SCHMITT.
CAR FENDER.
APPLICATION FILED JUNE 22, 1910.
974,300.
Patented Nov. 1, 1910.
2 SHEETS—SHEET 1.
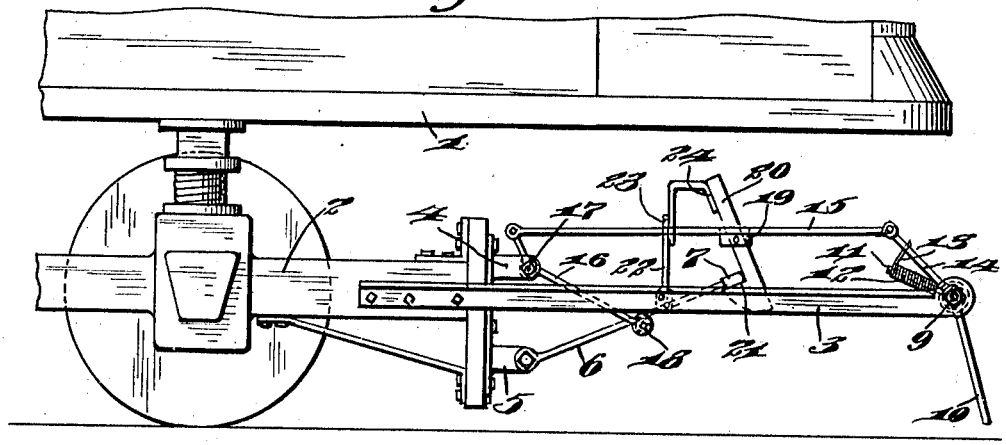
Witnesses
Theo. Rumann
R. H. Krenkel
Inventor
Otto J. Schmitt,
By Joshua R. H. Potts
Attorney O. J. SCHMITT.
CAR FENDER.
APPLICATION FILED JUNE 22, 1910.
974,300.
Patented Nov. 1, 1910.
2 SHEETS—SHEET 2.
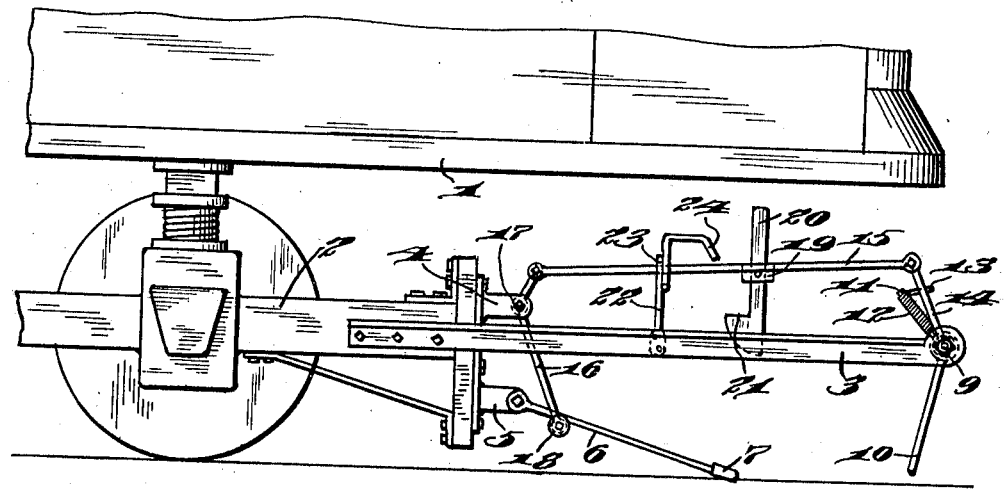
*Fig. 3*
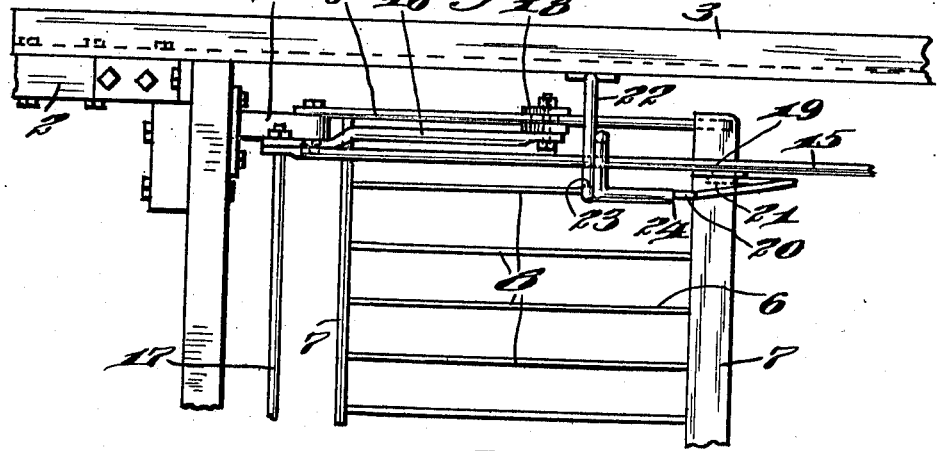
*Fig. 4*
*Fig. 5*
Witnesses
Inventor
Otto J. Schmitt,
By Joshua R. H. Potts
Attorney

UNITED STATES PATENT OFFICE.

OTTO J. SCHMITT, OF PHILADELPHIA, PENNSYLVANIA.

CAR-FENDER.

974,300.

Specification of Letters Patent.

Patented Nov. 1, 1910.

Application filed June 22, 1910. Serial No. 568,358.

*To all whom it may concern:*

Be it known that I, OTTO J. SCHMITT, a citizen of the United States, residing at Philadelphia, in the county of Philadelphia and State of Pennsylvania, have invented certain new and useful Improvements in Car-Fenders, of which the following is a specification.

My invention relates to improvements in car fenders, the object of the invention being to provide a car fender which is carried by the truck of the car, hence always maintained at the proper elevation, and not effected by the movements of the car body, to provide improved means for holding the fender elevated, and to provide improved means adapted to be struck by a person or object on the track to release the fender and to compel it to fall into close contact with the ground, insuring the picking up of a person or object and preventing any possibility of contact with the wheels.

A further object is to provide a car fender of extremely simple inexpensive construction with improved means for holding the fender elevated, preventing the vibrations of the car from releasing the same, and to provide tripping mechanism for releasing the fender holding means.

With these and other objects in view, the invention consists in certain novel features of construction and combinations and arrangements of parts, as will be more fully hereinafter described and pointed out in the claims.

In the accompanying drawings: Figure 1, is a view in side elevation illustrating my improved fender in normal set position. Fig. 2, is a plan view. Fig. 3, is a view similar to Fig. 1, showing the fender in its lowered position. Fig. 4, is a fragmentary plan view, and Fig. 5, is a detail perspective view of one of the fender holding catches.

1, represents the body of a car supported on a truck 2.

3, 3, are horizontal angle iron bars secured to the sides of the truck and extending forwardly as illustrated. On the front end of the truck, brackets 4 and 5 are secured, and to the lower brackets 5, a fender 6 is pivotally connected and may be made in various ways but preferably as illustrated, comprising parallel cross bars 7 connected by a plurality of longitudinal rods 8.

The forward ends of the angle iron bars 3 are connected by a cross rod 9 on which a tripping fender 10 is pivotally supported, said fender being normally positioned as shown in Fig. 1 so as to strike a person or object on the track. This tripping fender 10 is provided with crank arms 11 on which coiled springs 12 are located, and said coiled springs 12 are provided with spring arms 13 to engage levers 14, pivotally supported on rod 9, when the tripping fender is moved rearward by a contact with the person or object on the track. The free ends of these levers 14 are connected by rods 15 with the upper ends of levers 16. These levers 16 are pivotally supported between their ends on a rod 17 supported in the upper brackets 4, and the lower free ends of these levers 16 are provided with grooved rollers 18 positioned beneath the side bars of fender 6, and adapted to elevate the fender to the position shown in Fig. 1. On each rod 15, a plate 19 is secured, and pivoted catches 20 are pivotally supported between their ends on these plates. The lower ends of these catches 20 are provided with lugs or shoulders 21 to engage under the forward cross bar 7 of fender 6 to hold the fender in its elevated position.

To insure the catches remaining in the position shown in Fig. 1 and prevent their movement by vibrations of the car, rods 22 are fixed to the bars 3, are bent between their ends forming loops 23 to receive rods 15, and at their upper free ends are bent at an angle forming shoulders 24 against which the upper ends of the catches 20 bear, so that when the fender is in set position, these rods 22 prevent any pivotal movement of the catches in a direction to release fender 6.

In operation supposing a person or object to be on the track, the forward movement of the car will bring the tripping fender 10 into contact with the person or object causing the fender to swing rearwardly as shown in Fig. 3. This movement of the tripping fender will cause the arms 11 and the springs 12 thereon to move forwardly, and by reason of the contact of spring arms 13 with levers 14, the latter will be moved forwardly as well. This movement of the levers 14 causes the rods 15 and the catches to move forwardly, releasing fender 6 and permitting the latter to fall to the position shown in Fig. 3, so as to pick up the person or object on the track and prevent them from passing into contact with the wheels.

I have illustrated no particular means for returning the parts to set position, as this may be done by hand or by various mechanisms, and I do not limit myself to any particular means for accomplishing this result.

I preferably employ the spring arms 13 for the reason that they provide an elastic contact between the tripping fender and the levers 14, and should they move to a position in front of the levers 14, they may be readily returned to working position.

Various slight changes might be made in the general form and arrangement of parts described without departing from my invention, and hence I do not limit myself to the precise details set forth but consider myself at liberty to make such changes and alterations as fairly fall within the spirit and scope of the appended claims.

Having thus described my invention, what I claim as new and desire to secure by Letters Patent is:

1. In a car fender, the combination with a truck, of parallel horizontal forwardly extending bars secured to the truck, a fender pivotally connected to the truck, catches supported by said bars, engaging the free end of the fender and normally holding said fender in an elevated position, and a tripping fender pivotally connected to the forward ends of said bars and constructed to release said catches, substantially as described.

2. In a car fender, the combination with a truck, of forwardly projecting parallel bars secured to the truck, a fender pivotally connected to the truck, a tripping fender pivotally connected to the forward ends of said bars, levers pivotally connected to the truck, rollers on the lower ends of said levers engaging below the fender, levers pivotally connected to the forward ends of said bars, rods connecting the upper ends of the first-mentioned levers with the upper ends of the last-mentioned levers, catches pivotally supported on said rods and constructed to engage the fender and hold it in elevated position, and means on said tripping fender constructed to engage the last-mentioned levers and move the rods to release the catches from the fender, substantially as described.

3. In a car fender, the combination with a truck, of forwardly projecting parallel bars secured to the truck, a fender pivotally connected to the truck, a tripping fender pivotally connected to the forward ends of said bars, levers pivotally connected to the truck, rollers on the lower ends of said levers engaging below the fender, levers pivotally connected to the forward ends of said bars, rods connecting the upper ends of the first-mentioned levers with the upper ends of the last-mentioned levers, catches pivotally supported on said rods and constructed to engage the fender and hold it in elevated position, arms on said tripping fender, springs on said arms, spring arms on said springs located in a path to engage said last-mentioned levers whereby when said tripping fender is moved rearwardly, said rods will be moved forwardly to release the catches from the fender, substantially as described.

4. In a car fender, the combination with a truck, of forwardly projecting parallel bars secured to the truck, a fender pivotally connected to the truck, a tripping fender pivotally connected to the forward ends of said bars, levers pivotally connected to the truck, rollers on the lower ends of said levers engaging below the fender, levers pivotally connected to the forward ends of said bars, rods connecting the upper ends of the first-mentioned levers with the upper ends of the last-mentioned levers, catches pivotally supported on said rods and constructed to engage the fender and hold it in elevated position, means on the tripping fender for engaging said last-mentioned levers to move said rods forwardly and release the catches from the fender, and rods secured to said bars and located in the path of the upper ends of said catches whereby said catches are maintained normally in locking engagement with the fender, substantially as described.

In testimony whereof I have signed my name to this specification in the presence of two subscribing witnesses.

OTTO J. SCHMITT.

Witnesses:
  CHARLES E. POTTS,
  R. H. KRENKEL.